(12) United States Patent
Butselaar et al.

(10) Patent No.: US 8,368,432 B2
(45) Date of Patent: Feb. 5, 2013

(54) INTERFERENCE-TOLERANT COMMUNICATION CIRCUIT

(75) Inventors: Stefan Gerhard Erich Butselaar, Wijchen (NL); Louk Boomkamp, Beuningen (NL); Cornelis Klaas Waardenburg, Zeeland (NL); Ben Gelissen, Nijmegen (NL); Mehdi El-Ghorba, Nijmegen (NL)

(73) Assignee: NXP B.V., Eindhoven (NL)

( * ) Notice: Subject to any disclaimer, the term of this patent is extended or adjusted under 35 U.S.C. 154(b) by 37 days.

(21) Appl. No.: 12/945,248

(22) Filed: Nov. 12, 2010

(65) Prior Publication Data
US 2012/0119793 A1     May 17, 2012

(51) Int. Cl.
*H03B 1/00*        (2006.01)
*H03K 3/00*        (2006.01)

(52) U.S. Cl. ......... 327/108; 327/109; 327/110; 327/111
(58) Field of Classification Search ........... 327/108–112
See application file for complete search history.

(56) References Cited

U.S. PATENT DOCUMENTS

| | | | | |
|---|---|---|---|---|
| 6,249,099 | B1* | 6/2001 | Nessi et al. | 318/400.03 |
| 7,006,364 | B2* | 2/2006 | Jin et al. | 363/21.01 |
| 7,532,445 | B2* | 5/2009 | Rana et al. | 361/56 |
| 7,723,928 | B2* | 5/2010 | Ribarich | 315/307 |
| 7,906,994 | B2* | 3/2011 | Bell | 327/108 |
| 2006/0170043 | A1* | 8/2006 | Liu et al. | 257/341 |
| 2006/0181822 | A1* | 8/2006 | Rana et al. | 361/56 |
| 2007/0182386 | A1* | 8/2007 | Garner | 323/225 |
| 2008/0225455 | A1* | 9/2008 | Hartley et al. | 361/93.2 |
| 2010/0079186 | A1* | 4/2010 | Zannoth et al. | 327/333 |
| 2010/0188872 | A1* | 7/2010 | Matsumoto et al. | 363/21.06 |
| 2010/0213985 | A1* | 8/2010 | Bell | 327/108 |
| 2010/0308859 | A1* | 12/2010 | Chimakurty et al. | 326/27 |
| 2011/0050322 | A1* | 3/2011 | Sicard | 327/419 |
| 2012/0007637 | A1* | 1/2012 | Fukuda | 327/110 |

OTHER PUBLICATIONS

FlexRay Preliminary Node-Local Bus Guardian Specification V2.0.9, Dec. 15, 2005, p. 1-75.
FlexRay Preliminary Central Bus Guardian Specification V2.0.9, Dec. 15, 2005, p. 1-38.
FlexRay Requirements Specification V2.1, Dec. 19, 2005, p. 1-115.
FlexRay Protocol Specification V2.1 (Rev. A), Dec. 22, 2005, p. 1-245.
FlexRay Electrical Physical Layer Specifications V2.1 (Rev. B), p. 1-96, Nov. 2006.
FlexRay node transceiver TJA1082 Product data sheet, Rev. 02, Aug. 10, 2009 (published by NXP Semiconductors of Eindhoven, The Netherlands).
CAN in Automation (CiA), V3.0.0: CAN Physical layer for industrial applications specification, Mumbai, India, Feb. 2010.
FlexRay Electrical Physical Layer Specifications V3.0, p. 1-134, Oct. 2010.

* cited by examiner

*Primary Examiner* — Adam Houston

(57) ABSTRACT

An interference-tolerant transmitter is provided. In accordance with various example embodiments, a transmitter circuit includes a control circuit configured to maintain the sum of current as applied to a load from respective high-side and low-side current sources at a target level (e.g., range). In some applications, clamp circuits are used to clamp current to high and low sides of the load respectively in response to changes at the low-side and high-side of the load.

22 Claims, 8 Drawing Sheets

INTERFERENCE-TOLERANT COMMUNICATION CIRCUIT

FIELD

Aspects of various embodiments of the present invention are directed to communications systems, and more particularly to such systems that are operable under high voltage conditions.

BACKGROUND

Many communications systems, such as systems that involve bus communications, are susceptible to (largely undesirable) high-voltage conditions, as may be present under conditions of electromagnetic interference (EMI), such as ISO pulses. This interference can raise issues with system operation.

One type of system that is susceptible to undesirable operation under EMI is an automotive type of bus communications system operated in states including a data "one" and a data "zero" state. Often, switching between states is controlled gradually, to ensure that circuits relating to each state are not concurrently active. The common voltage of the bus is often fixed using relatively high impedances (e.g., greater than 20 Kohms).

Under conditions in which the bus is subjected to EMI, the voltages on the communications system corresponding to the respective data states will either rise or fall, and may go beyond the supply limits. For example, when bus voltages rise above the supply voltage or drop below ground level, the current source (for either data "one" or "zero") will not behave correctly. When one of the current sources deteriorates or is switched off completely, the operation of the bus is detrimentally impacted.

Under the above current deterioration conditions, any receiver monitoring the voltage on the bus is affected. For example, when the voltage on the bus becomes too low, received signals may suffer from jitter or, in extreme cases, the receiver will be unable to distinguish between data "one" and data "zero," and data transfer may be lost.

These and other matters have presented challenges to the design and implementation of communications systems for a variety of applications.

SUMMARY

Various example embodiments are directed to communications circuits, devices and their implementation.

According to an example embodiment, an interference-tolerant communications circuit includes high and low-side current sources, and a control circuit. The high-side current source is coupled to a high-side input pin of a load and configured to operate the load at a high level. The low-side current source is coupled to a low-side input pin of the load and configured to operate the load at a low level. The control circuit is configured to, in response to interference conditions that alter the current supplied by at least one of the current sources on one of the input pins, maintain the sum of the current applied to the load by the current sources at a target current level.

Another example embodiment is directed to an interference-tolerant communications circuit. The communications circuit includes a load having positive and negative input pins, which are respectively coupled to high-side and low-side current sources that drive the load at high and low levels. A high-side clamping circuit is responsive to electromagnetic interference at the high-side current source by controlling the low-side current source (e.g., circuits connected to the negative input pin) to maintain the sum of the current applied to the load circuit by the current sources at a target level. A low-side clamping circuit is responsive to electromagnetic interference at the low-side current source by controlling the high-side current source (e.g., circuits connected to the positive input pin) to maintain the sum of the current applied to the load circuit by the current sources at a target level.

In accordance with another example embodiment, interference effects are mitigated in a communications circuit having a load, a high-side current source coupled to a high-side input pin of a load and configured to operate the load at a high level, and a low-side current source coupled to a low-side input pin of the load and configured to operate the load at a low level. In response to interference conditions that alter the current supplied by at least one of the current sources on one of the input pins, the sum of the current applied to the load by the current sources is at a target current level. In some implementations, this approach involves applying a current at the high-side input pin to mitigate voltage fluctuations on the load, in response to the low-side current source going off. In other implementations, this approach involves applying a current at the low-side input pin to mitigate voltage fluctuations on the load, in response to the high-side current source going off.

The above discussion/summary is not intended to describe each embodiment or every implementation of the present disclosure. The figures and detailed description that follow also exemplify various embodiments.

FIGURES

Various example embodiments may be more completely understood in consideration of the following detailed description in connection with the accompanying drawings, in which.

Figure 1:
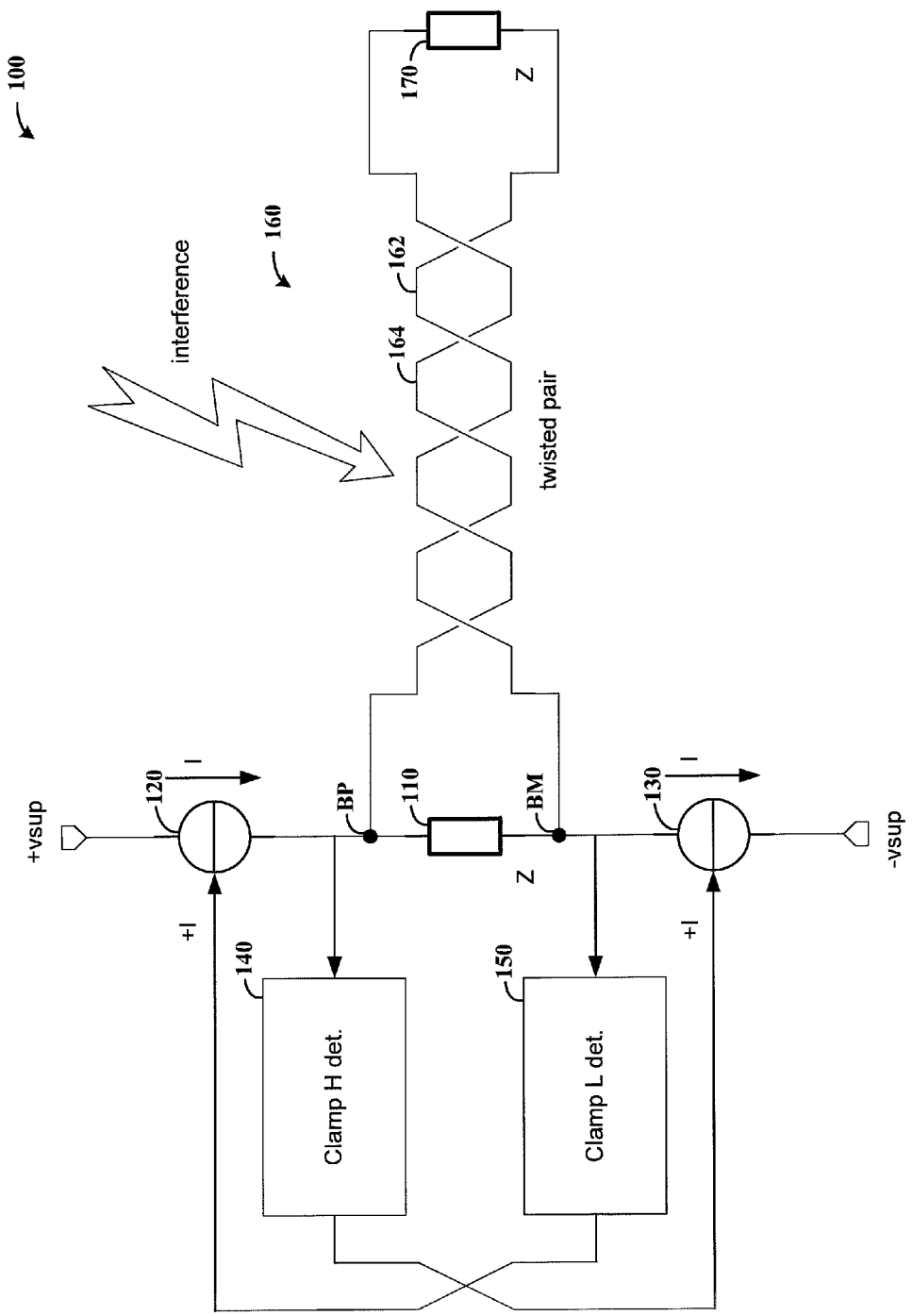
FIG. 1 shows a transmission circuit, in accordance with an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims.

DETAILED DESCRIPTION

Aspects of the present invention are believed to be applicable to a variety of different types of communications devices, systems and arrangements, including those involving transmitters for current-driven differential systems and communications busses. While the present invention is not necessarily so limited, various aspects of the invention may be appreciated through a discussion of examples using this context.

Various example embodiments are directed to a communications circuit that operates to provide a signal having an amplitude that is about constant or nearly constant, while subjected to interference such as those involving high voltage swings that can result from electromagnetic interference (EMI). In some implementations, the transmitter is a differential output transmitter configured to operate under conditions characterized by a high-amplitude common voltage that exceeds supply voltages. Aspects of various related embodiments are directed to such a transmitter, implemented to reduce jitter on received signals and mitigate the potential for communication loss due to voltage swings.

Another example embodiment is directed to an interference-tolerant communications circuit. The circuit includes high and low side current sources coupled to a load and respectively configured to operate the load at high and low levels. A control circuit is configured to maintain the sum of the current applied to the load by the current sources at a target current level under interference conditions that alter the current supplied by at least one of the current sources. In various implementations, this control involves applying an offsetting current to one of the current sources, in response to a change in current in the other one of the current sources, to mitigate or prevent fluctuations in voltage amplitude on the load (e.g., using a clamping circuit). In other implementations, the current in one of the current sources is increased in response to one of the current sources going off. Still other implementations are directed to maintaining the amplitude of the voltage on the load at a target voltage amplitude level (e.g., under interference that, absent the control circuit, would cause the voltage on the load to exceed an operational voltage range).

As discussed herein, maintaining a target current or target voltage level refers to maintaining a target level that is within a set or functional operational range of a particular circuit (e.g., a bus or other load) that is being controlled. In various embodiments, maintaining a target level refers to maintaining a value within a range of values under which a particular circuit can operate. In this context, several examples below refer to such levels as being within, for example, an operational voltage range of 0.5V to 0.1V. For example, certain embodiments are directed to a differential output transmitter integrated circuit configured to ensure or otherwise maintain constant, or nearly constant, voltage amplitude on a bus or other load circuit. In particular, the transmitter integrated circuit is configured to maintain the voltage amplitude under conditions in which a bus or other circuit is subjected to high common mode voltages, such as under an externally-applied electromagnetic interference. Using this approach, voltage swings due to high-voltage conditions, such as those due to EMI, can be mitigated for outputs generally maintained within a relatively small voltage range (e.g., between 4.75V and 5.25V), to address high-voltage conditions that may subject circuitry to many times the aforesaid range of voltages.

In some embodiments, a transmitter is configured to double a remaining half-stage output current during clamping of the other half-stage of a bus or other current-driven circuit, as caused by a high common input voltage swing on the bus or other current-driven circuit. This doubling effects a constant (or nearly constant) output voltage, to facilitate voltage-level detection for the differential input of a receiver.

In some embodiments, an output circuit includes a transmitter output stage having a full bridge and current sources configured to fix, or set, the amplitude at an external load. Some implementations are directed to the use of such an output circuit, such as an external bus load having an impedance of about 40-55 Ohms.

A more particular implementation is directed to an interference-tolerant communications circuit having high-side and low-side current sources, respectively coupled to a load for operating the load at high and low levels. The current sources are coupled to the load directly such as by a direct conductor, or via another circuit component. The communications circuit may, for example, operate a load such as a bus at a high level corresponding to a data one, and at a low level corresponding to a data zero. The communications circuit also includes a control circuit that maintains the sum of the current applied to the load by the current sources at a constant level in response to interference that alters the current supplied by at least one of the current sources. This current-based control facilitates the control of the voltage amplitude on the load.

The various embodiments as described herein are applicable to implementation with a variety of communications circuits, such as current-driven differential output circuits. For example, many embodiments are directed to devices, systems and methods involving a transmitter that operates in accordance with protocols, requirements and other conditions as specified by the FlexRay Consortium. Such operation may, for example, involve aspects that correspond to the information presented in documents published by FlexRay including: Requirements Specification V2.1, Protocol Specification V2.1 (Rev. A), all FlexRay Electrical Physical Layer Specifications including Specifications V2.1 (Rev. B) and V3.0, Preliminary Node-Local Bus Guardian Specification V2.0.9, and Preliminary Central Bus Guardian Specification V2.0.9, all of which are fully incorporated herein by reference. Various embodiments may also be implemented with transmitter circuits as described in the FlexRay node transceiver TJA1082 Product data sheet, Rev. 02, 10 Aug. 2009 (published by NXP Semiconductors of Eindhoven, The Netherlands), which is fully incorporated herein by reference. Other embodiments are directed to communications circuits operated in accordance with the Controller Area Network (CAN) as specified by the CAN in Automation (CiA) organization of Mumbai, India, including the V3.0.0: CAN Physical layer for industrial applications specification and those previously published by the CiA, all of which are also incorporated herein by reference. Still other embodiments are directed to a transmitter or other communications circuit configured to operate in accordance with the Intelligent Vehicle Network (IVN) system such as the IVN3 system available from Clever Devices of Plainview, N.Y. In many implementations, aspects of the present invention are directed to circuits that operate under a wide range of voltage, such as may correspond to operation of between about −40V to 40V, and can be implemented on systems (such as those above) designed for transmitter operation with a supply voltage operating range of about 1V (e.g., a FlexRay transmitter operating in the range of 4.5V to 5.5V), while maintaining a constant or nearly constant output (e.g., bus) amplitude.

Turning now to the figures, FIG. 1 shows a block schematic for a transmitter circuit 100, in accordance with another example embodiment. The transmitter circuit 100 includes current sources 120 and 130, respectively configured to couple current to positive and negative pins BP and BM of a load circuit 110, such as a bus. High and low clamp detection circuits 140 and 150 are configured to detect voltage conditions as respectively present at pins BP and BM, and to control the amplitude of voltage on the load circuit 110.

Each of the high and low clamp circuits 140 and 150 is implemented using one or more approaches as described herein, to control the amplitude of the voltage on the load circuit and mitigate undesirable voltage swings. As an example source of such a voltage swing, an unshielded twisted pair circuit conductor 160 is shown coupled to the load circuit 110, with one of the pairs 162 connected to the positive pin BP and the other of the pairs 164 connected to the negative pin BM. The twisted pair circuit conductor 160 is also connected to another load 170 (e.g., for bus communications where the load 110 is a bus).

Each of the clamp circuits 140 and 150 mitigates or eliminates voltage swings and/or related current fluctuation at the load circuit 110 that result from interference as introduced on the twisted pair circuit conductor 160, such as via EMI. The interference shown as entering the unshielded twisted pair circuit conductor 160 distorts the voltages on load pins BP and BM. When one of the voltages on pins BP or BM fluctuates outside the supply voltage range, the corresponding current source will go off. The corresponding clamp detection circuit (e.g., 140 for BP, or 150 for BM) responds by increasing the current into the other current source (the source not going off), and mitigates or prevents the differential bus voltage from obtaining an undesirable value.

For example, where the voltage at pin BP exceeds the supply voltage (e.g., varying outside of an expected range) or where the current of current source 120 goes off, due to EMI introduced on the twisted pair conductor 162, the clamp circuit 140 senses this and, via connection to the current source 130, increases the current at current source 130 to compensate. Clamp circuit 150 is configured to operate similarly, in response to a voltage at pin BM exceeding the supply voltage or where the current of current source 130 goes off. In this context, the respective clamp circuits 140 and 150 function to control the operation of the transmitter circuit 100 under conditions in which the circuit is subjected to undesirable conditions, such as those resulting from interference.

Figure 2:
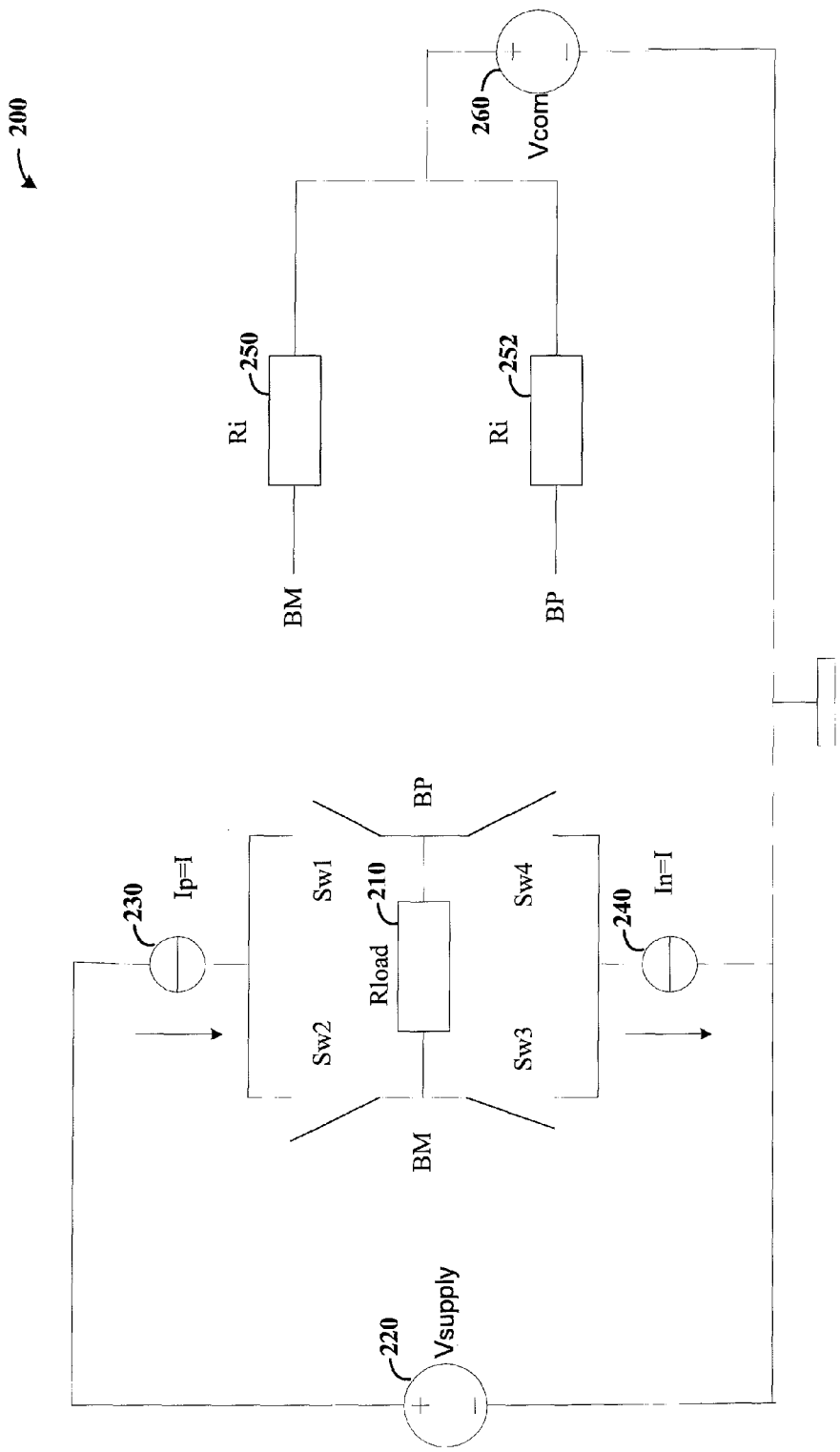
FIG. 2 shows a differential output transmitter configured for operation under high-voltage conditions, in accordance with another example embodiment of the present invention.

FIG. 2 shows a transmission circuit 200, in accordance with a more particular example embodiment. The transmission circuit 200 is connected to a load 210 (Rload), such as a communications bus, using a voltage supply 220 and current sources 230 and 240. Impedance-type circuits 250 and 252 are respectively connected between an RF voltage supply 260 (Vcom), and high pin (BP) and low pin (BM) sides of the load 210. The impedance-type circuits 250 and 252 have an impedance (Ri) that is common (or nearly common) for the two circuits, and can be implemented using one or more types of circuits such as a series combination of a resistor and a capacitor.

When the load 210 is at a high level (e.g., as for data "one"), switches SW1 and SW3 are closed, and switches SW2 and SW4 are open. The voltage at BP is then greater than the voltage at BM. Correspondingly, when the load 210 is at a low level (e.g., as for a data "zero"), switches SW1 and SW3 are open, and switches SW2 and SW4 are closed. The voltage at BM is then greater than the voltage at BP.

The transmission circuit 200 is configured to operate while subjected to high voltage operational conditions, such as may result from an externally-applied EMI such as discussed above, by mitigating and/or canceling the high voltage characteristics. More specifically, the impedance-type circuits 250 and 252 couple RF voltage supply 260 to both current sources 230 and 240, and cancel the net effect of EMI on the load 210. For instance, the circuit 200 can be operated under EMI injection via direct power injection (DPI) using a coupling network including the impedance-type circuits 250 and 252, with effects of the EMI being cancelled or otherwise compensated for.

Considering an implementation of the load 210 as a bus, the behavior for the current sources 230 (Ip) and 240 (In) during EMI influences the voltage (vBus) on the load (bus) 210 as $$vBus = \frac{Ip}{2} \cdot \frac{2Ri \cdot Rload}{Rload + 2Ri} + \frac{In}{2} \cdot \frac{2Ri \cdot Rload}{Rload + 2Ri} \qquad (1)$$
$$= \left(\frac{Ip + In}{2}\right) \cdot \frac{2Ri \cdot Rload}{Rload + 2Ri};$$

and the common bus voltage (VCOMMON) is $$VCOMMON = Vcom + \frac{(Ip - In) \cdot \frac{Ri(Rload + Ri) + Ri^2}{Rload + 2Ri}}{2} \qquad (2)$$
$$= Vcom + \frac{(Ip - In) \cdot Ri}{2}.$$

In consideration of the above, VCOMMON may also be characterized as:

$$VCOMMON = \frac{V(BP) + V(BM)}{2}.$$

During operations (e.g., without EMI), Ip=In=I which leads to:

$$vBus = I \cdot \frac{2Ri \cdot Rload}{Rload + 2Ri} \qquad (3)$$
$$VCOMMON = Vcom$$

During EMI or other high-voltage conditions, the circuit 200 operates so that the sum of Ip and In, from current sources 230 and 240, is held about constant (e.g., a decrease of Ip leads to an increase of In). In addition, if one of the current sources 230 and 240 is switched off by EMI doubling, the other current source is operated to cancel the effect on the voltage vBus on the load (bus) 210.

A variety of circuit configurations are implemented to address high-voltage operational conditions, in accordance with various embodiments including those discussed above. The following discussion and figures characterize several such exemplary configurations. One or more of these approaches may, for example, be implemented as part of the transmitter circuit 100 (such as with clamp circuits 140 and 150), or with the circuit 200 as part of, or in addition to, the impedance-type circuits 250 and 252. For instance, the various circuits as applied below can be implemented using the full switching circuit of a full bridge as shown in FIG. 2 (omitted for clarity and readability in connection with other figures). In addition, while the following discusses various example values and related approaches to the mitigation of high-voltage conditions, the embodiments are applicable to implementation at a variety of voltage levels, and in accordance with other conditions.

Figure 3:
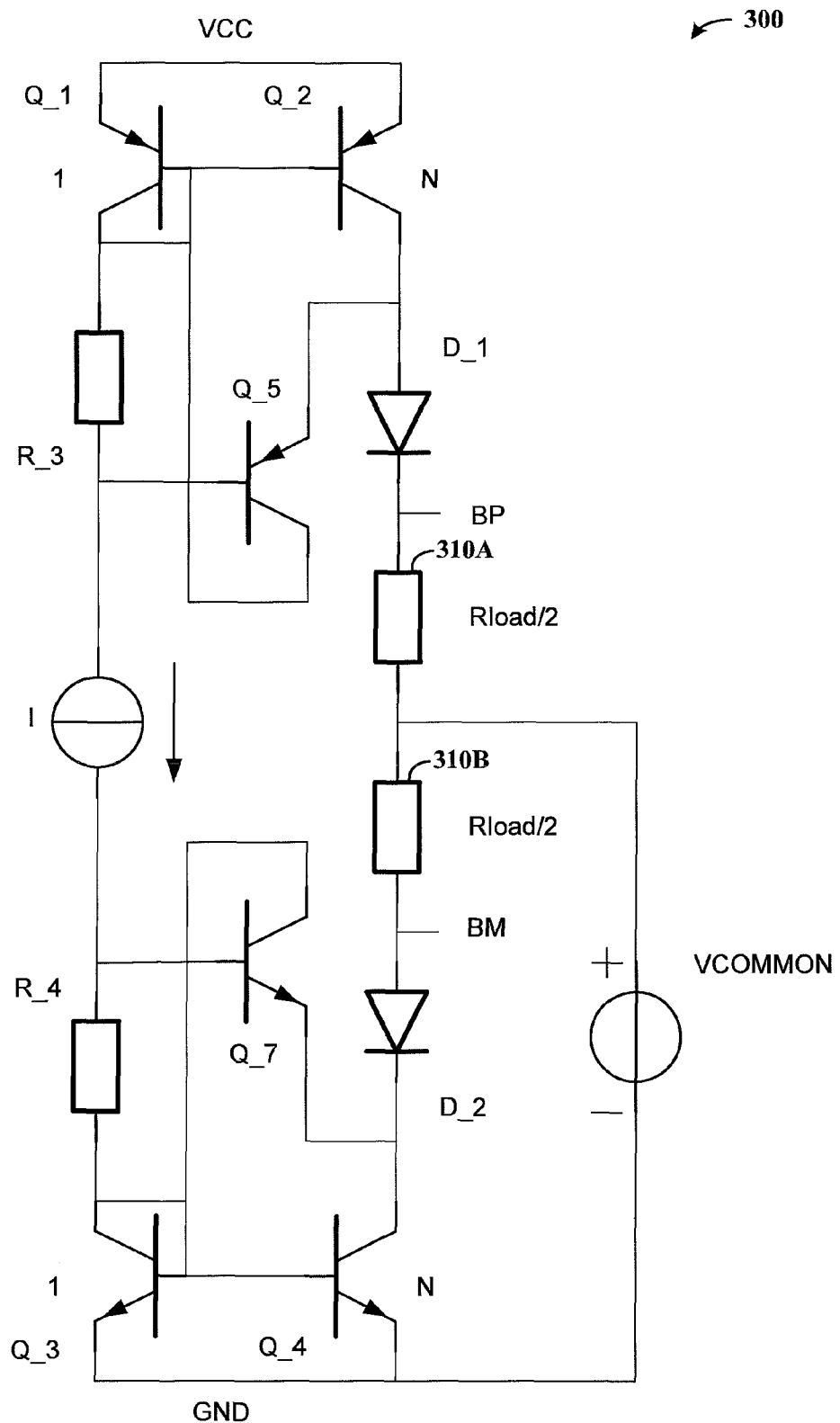
FIG. 3 shows a transmitter circuit configured to withstand voltage fluctuations, in accordance with another example embodiment.

FIG. 3 shows a differential output transmitter 300 configured for operation under high-voltage conditions, according to another example embodiment of the present invention. The differential output transmitter 300 may be implemented in a manner similar to that shown in and described in connection with FIG. 1 above, with loads 310A and 310B connected between high and low pins BP and BM, with a VCOMMON supply connected between the loads. Bipolar Junction Transistors Q1, Q2, Q3 and Q4 operate as current mirrors, with Q1 and Q2 connected to a supply voltage (VCC) and Q3 and Q4 connected to ground (GND). A diode D1 is connected between current source Q2 and load 310A, and another diode D2 is connected between load 310B and current source Q4. Impedance circuit R3 and BJT Q5 operate as a clamp, and impedance R4 and Q7 operate as another clamp, such as described above.

Under normal operation, VCOMMON is about half of VCC, and current sources Q2/Q4 (e.g., bipolar junction transistors (BJTs)) are both active. If VCOMMON exceeds VCC, current source Q4 stays active. If VCOMMON drops under GND, current source Q2 stays active. Under either of these conditions in which VCOMMON either exceeds VCC or drops under GND, the BP-BM is 0.5*Vdiff. Recovery to Vdiff, when VCOMMON is around 0.5*VCC, which can be slow if current sources Q2 or Q4 must recover from saturation, is enhanced via the clamp circuits (R3/Q5 and R4/Q7). Current is still flowing in current mirrors Q1/Q2 and Q3/Q4 during clamping, with VCOMMON being outside the supply range window, which facilitates relatively fast recovery of the current mirror outputs Q2 and Q4. In normal operation and at clamping, the current through R3/R4 is constant, so the reference clamp voltage is also constant.

Figure 4:
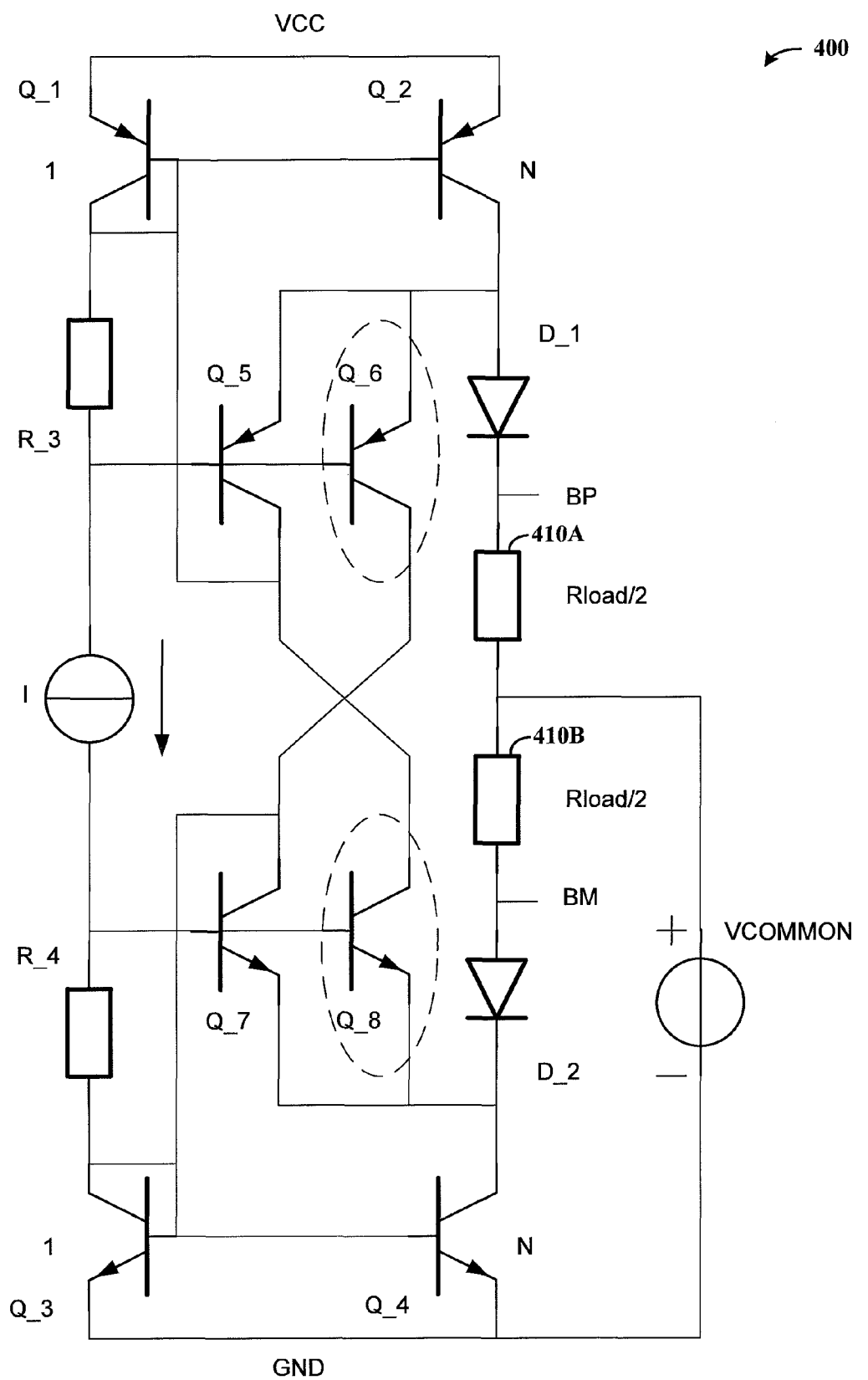
FIG. 4 shows a transmitter circuit in which a copy of a clamped current is mirrored to a complementary current mirror, in accordance with another example embodiment of the present invention.

FIG. 4 shows another transmitter circuit 400 having clamping circuits and other components that are similar to the transmitter circuit 300 shown in FIG. 3, and configured to provide a mirror copy of the clamped current in accordance with another example embodiment of the present invention. Relative to the circuit 300, the circuit 400 also includes loads 410A and 410B and additional clamping circuit components, including bipolar junction transistors Q6 and Q8. These respective transistors Q6 and Q8 are respectively connected to mirror a copy of the clamped current to the complementary current mirror, with Q6 connected to Q3, and with Q8 connected to Q1. Using this approach, Vdiff in normal or clamping mode is held about constant and does not halve, facilitating receiver detection during clamping.

Figure 5:
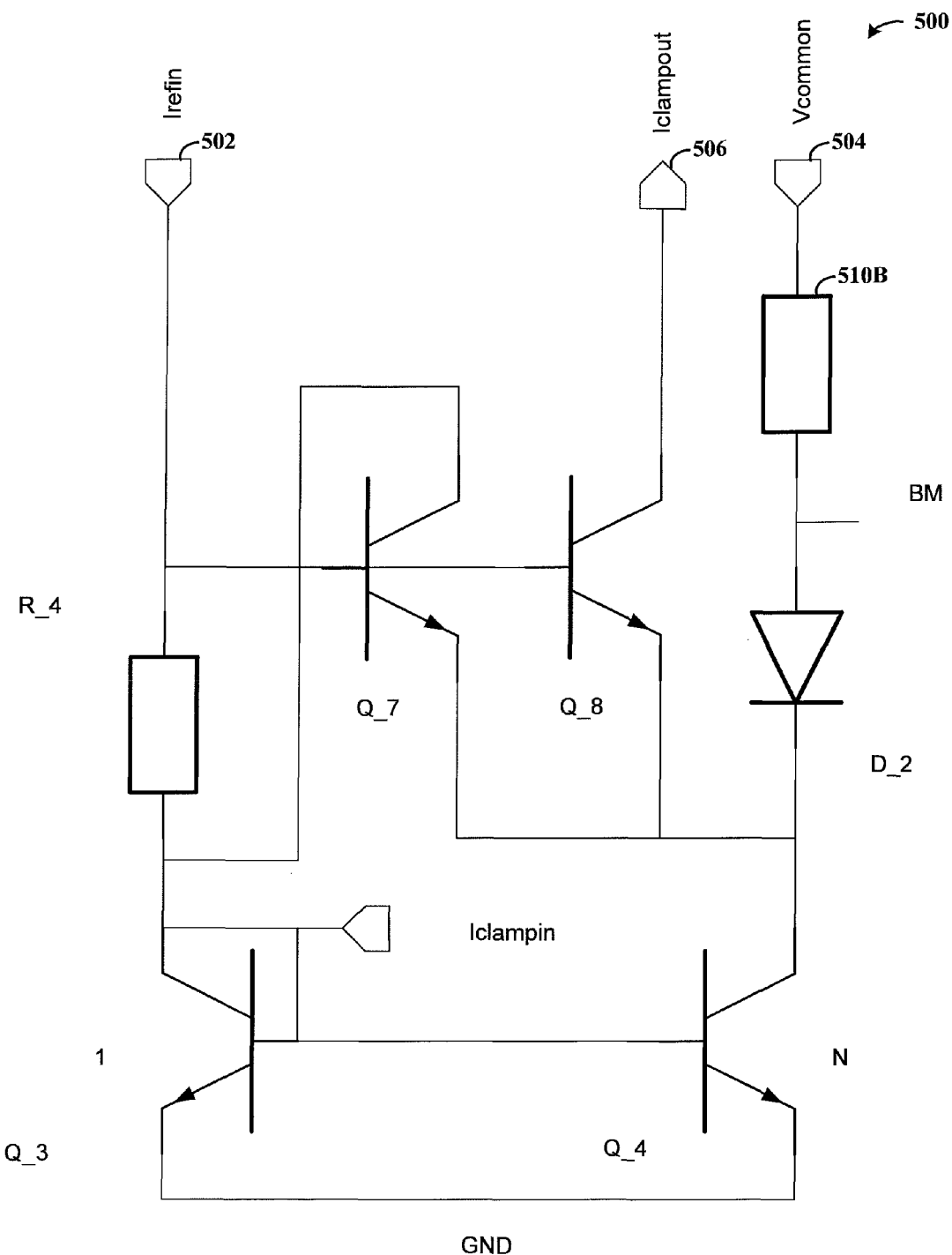
FIG. 5 shows half of a transmitter output stage for a voltage-tolerant transmitter circuit, in accordance with another example embodiment.

FIG. 5 shows one half of a transmitter output stage 500 for a voltage-tolerant transmitter circuit, in accordance with another example embodiment. The transmitter output stage circuit 500 may, for example, be implemented in connection with the differential output transmitter shown in FIG. 4. Impedance R4 is connected to an input reference terminal 502 for current Irefin, load 510B is connected to Vcommon at terminal 504, and clamp copy Q8 is connected to mirror clamping current Iclampout at terminal 506 (e.g., to mirror Q1, when connected as shown in FIG. 4).

The following discusses exemplary operational characteristics of the output stage 500 in FIG. 5, as may also be implemented with other circuits discussed herein. For operational considerations, the base currents can be assumed to be relatively small and for simplified explanation, they are neglected in the exemplary equations below.

In normal mode, the voltage at which the output starts to clamp is equal to:

$$Vclamp=vbe(Q\_3)+(Irefin*R\_4)-vbe(Q\_7). \quad (4.1)$$

If approximately all base-emitter voltages (vbe's) are equal then $$Vclamp=Irefin*R4. \quad (4.2)$$

The current through R_4 is constant, as the current of Q7 is also fed back through R_4. A copy of the clamp current is made by Q8 as $$I(Q7)=I(Q8)=Irefin*N/(N+1), \quad (4.3)$$

with I(Q7) and I(Q8) respectively referring to the current at these switches. If N>>1 then $$I(Q7)=I(Q8)=Irefin. \quad (4.4)$$

The current Ic(Q8) is a copy of the current Irefin with this clamping approach. The Ic(Q8) is used for feedback to the complementary current mirror, for doubling the current during clamping of this stage. On terminal Iclampin, the current is fed back from the complementary clamping stage for doubling the output current of this stage (e.g., as shown in FIGS. 3 and 4).

Figure 6:
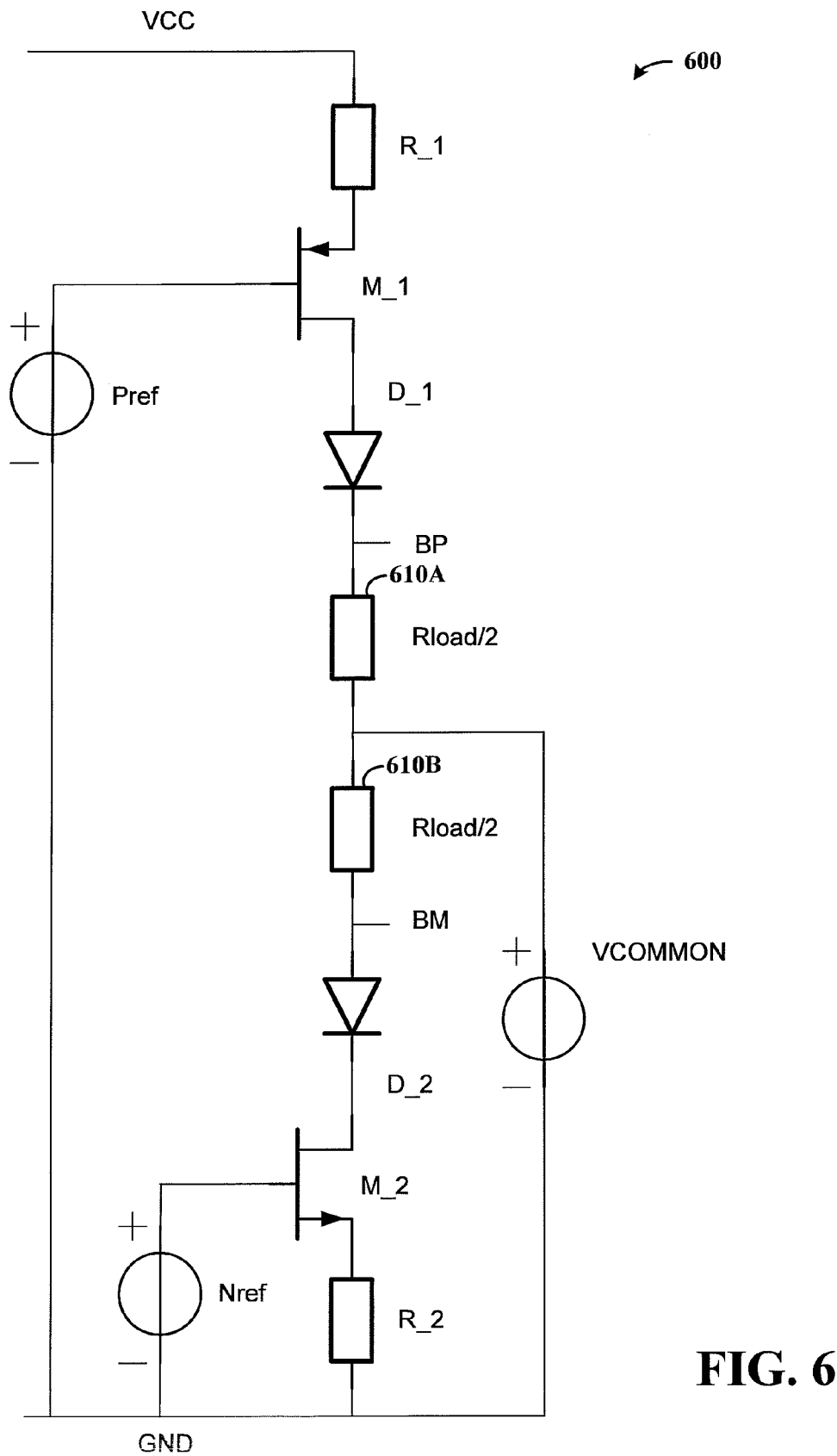
FIG. 6 shows another transmitter circuit configured to yield unchanged load voltages under common disturbances, in accordance with another example embodiment.

FIG. 6 shows another example embodiment involving a transmitter circuit 600 configured to withstand voltage fluctuations, for loads 610A and 610B. The circuit 600 may be implemented in a manner that is similar to that shown in FIG. 1, with load pins BP and BM respectively implemented for positive and negative connection to the loads 610A and 610B.

A voltage supply Vcc is connected to positive pin BP via an impedance circuit R1, a p-channel MOSFET M1 and a diode D1. Ground (GND) is connected to negative pin BM via impedance circuit R2, an n-channel MOSFET M2 and a diode D2. Reference voltage circuits Nref and Pref control the transition area to mitigate the application of high voltage swings to the loads 610A and 610B. More specifically, Nref and Pref respectively control MOSFETS M1 and M2 from linear (switch) to saturation (current-source).

Figure 7A:
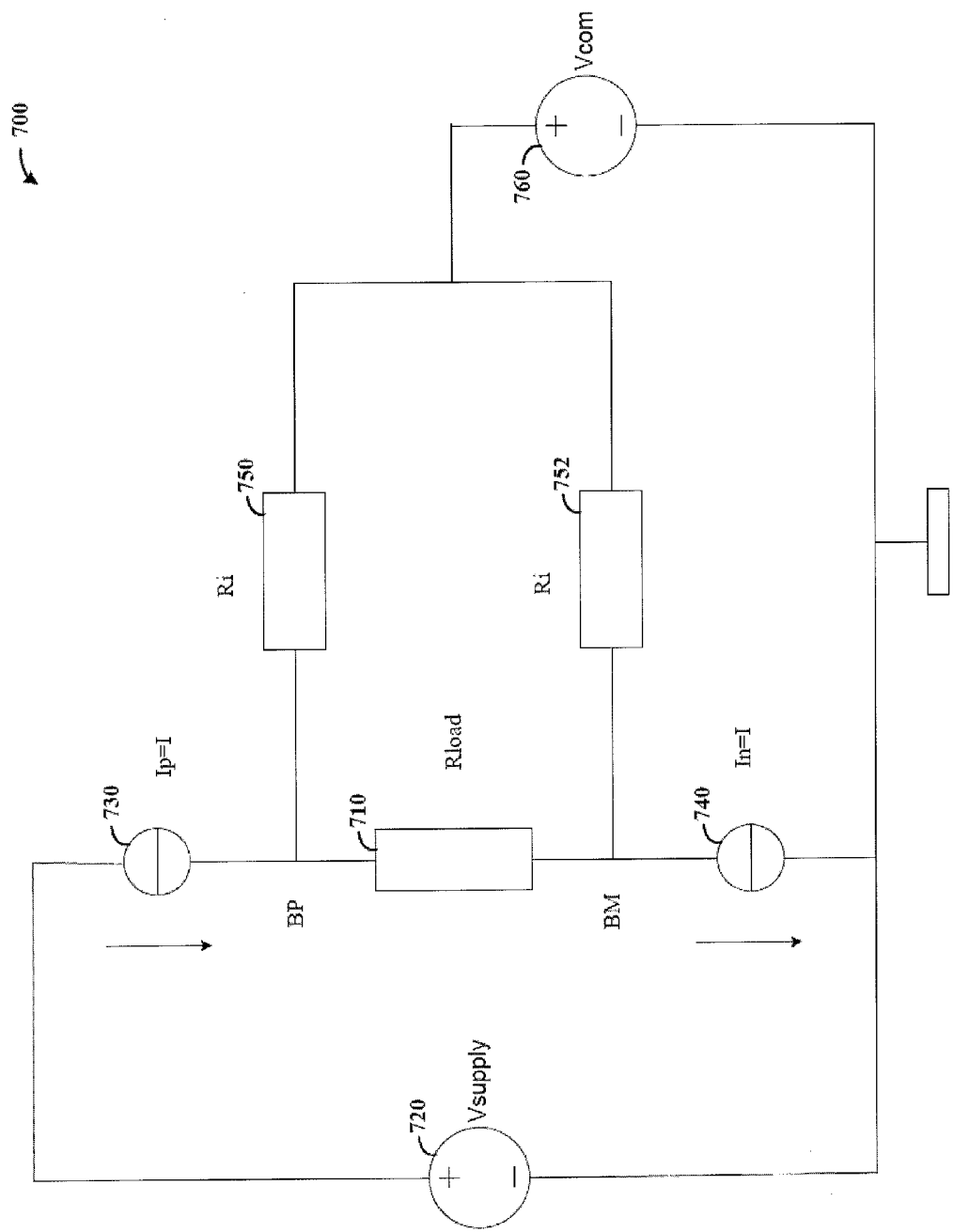
FIG. 7 shows a block schematic for a transmitter circuit, in accordance with another example embodiment.
Figure 7B:
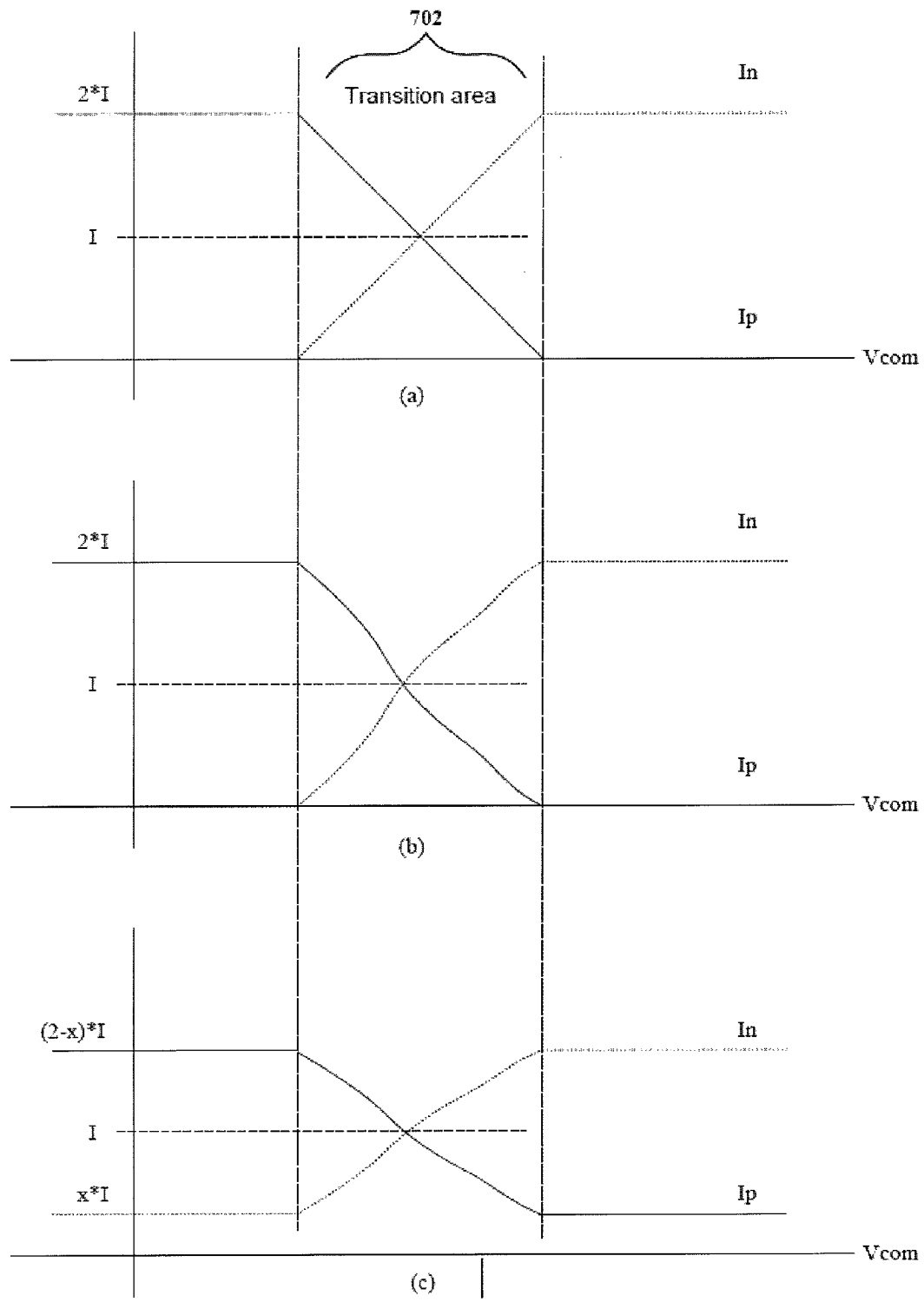

FIG. 7 shows a transmitter circuit 700 (FIG. 7A) and operational characteristics in plots a, b and c (FIG. 7B), in accordance with other example embodiments. The circuit 700 is similar to that shown in FIG. 2, with a load 710 being supplied from a voltage supply 720 via current sources 730 and 740. The current sources are connected at high and low terminals BP and BM of the load 710. Impedance-based circuits 750 and 752 operate to couple Vcommon from supply 760 to mitigate voltage fluctuation effects at the load 710.

FIG. 7B shows exemplary Ip/In currents that can be implemented with the transmitter circuit 700 and/or with others as described herein. The respective currents are controlled to yield unchanged (or nearly unchanged) load voltages despite common disturbances. In this context, a nearly unchanged load voltage may involve a voltage that is maintained with an operation range of the load 710, such as within about 0.5V, or within a smaller range of less than about 0.1V, or other ranges depending upon the operation of the load 710. The region 702 in which In is taken over by Ip (or vv) for each of plots a, b and c is denoted as the transition area.

The circuits and approaches characterized herein may be implemented in a variety of applications. Many embodiments are directed to control circuits implemented in automotive applications, such as in (central) body control modules, engine control, active suspension, drive by wire and oil-less breaking systems. Other embodiments are directed to industrial applications, such as in the control of devices and systems operating in environments that suffer from high EMI. Still other applications are directed to other vehicular systems, aircraft, spacecraft and to communications circuits generally susceptible to EMI or other conditions that may cause voltage-related issues.

Based upon the above discussion and illustrations, those skilled in the art will readily recognize that various modifications and changes may be made to the present invention without strictly following the exemplary embodiments and applications illustrated and described herein. For example, different types of clamping circuits, or other balancing type circuits, that can be used to maintain the voltage on the load or bus as discussed herein, can be implemented in connection with various embodiments. In addition, the circuits as shown can be implemented as part of much larger systems and/or other systems, for a variety of automotive, industrial and other applications. Such modifications do not depart from the true spirit and scope of the present invention, including that set forth in the following claims.

What is claimed is:

1. An interference-tolerant communications circuit comprising:
   a high-side current source coupled to a high-side input pin of a load and configured to operate the load at a high level;
   a low-side current source coupled to a low-side input pin of the load and configured to operate the load at a low level; and
   a control circuit configured to, in response to interference conditions that alter the current supplied by at least one of the current sources on one of the input pins, maintain the sum of the current applied to the load by the current sources at a target current level.

2. The circuit of claim 1, wherein the control circuit includes, for each current source, a clamping circuit configured to apply an offsetting current to one of the current sources, in response to a change in current in the other one of the current sources, to mitigate fluctuations in voltage amplitude on the load.

3. The circuit of claim 1, wherein the load is a communications bus, and wherein the control circuit is configured to maintain the sum of the current applied to the load by the current sources at a target current level by, in response to one of the current sources going off, increasing the current in the other one of the current sources.

4. The circuit of claim 1, wherein the control circuit is configured to maintain the amplitude of the voltage on the load at a target voltage amplitude level.

5. The circuit of claim 1, wherein the control circuit is configured to control the amplitude of the voltage on the load between an operational voltage range in the presence of interference that, absent the control circuit, would cause the voltage on the load to exceed the operational voltage range.

6. The circuit of claim 1, wherein the control circuit is configured to maintain the sum of the current applied to the load by the current sources at a target current level to control the amplitude of the voltage on the load in an operational voltage range that varies less than 0.5V.

7. The circuit of claim 1, wherein the control circuit is configured to maintain the sum of the current applied to the load by the current sources at a target current level to control the amplitude of the voltage on the load in an operational voltage range that varies less than 0.1V.

8. The circuit of claim 1, wherein the high-side and low-side current sources are respectively configured to couple current to positive and negative pins of the load.

9. The circuit of claim 1, wherein the control circuit includes
   a high-side clamp detection circuit configured to detect a voltage condition present at a high side of the load to which the high-side current source is connected and, in response to the voltage condition exceeding a threshold, couple current to the low-side current source to set the differential voltage across the load, and
   a low-side clamp detection circuit configured to detect a voltage condition present at a low side of the load to which the low-side current source is connected and, in response to the voltage condition exceeding a threshold, couple current to the high-side current source to set the differential voltage across the load.

10. An interference-tolerant communications circuit comprising:
    a load circuit having a positive input pin and a negative input pin;
    a high-side current source coupled to the load circuit via the positive input pin and configured to drive the load at a high level;
    a low-side current source coupled to the load circuit via the negative input pin and configured to drive the load at a low level;
    a high-side clamping circuit configured to, in response to electromagnetic interference at the high-side current source, control the low-side current source to maintain the sum of the current applied to the load circuit by the current sources at a target level; and
    a low-side clamping circuit configured to, in response to electromagnetic interference at the low-side current source, control the high-side current source to maintain the sum of the current applied to the load circuit by the current sources at a target level.

11. The circuit of claim 10, wherein the high-side and low-side clamping circuits are respectively configured to maintain the sum of the current applied to the load circuit by the current sources at a target level by maintaining the sum of the current applied to the load circuit by the current sources within a preset range of current values.

12. The circuit of claim 10, wherein the high-side and low-side clamping circuits are respectively configured to maintain the sum of the current applied to the load circuit by the current sources at a target level by maintaining the voltage differential across the positive and negative input pins within a preset range of voltage.

13. The circuit of claim 10, wherein
    the high-side clamping circuit is configured to control the low-side current source to maintain the sum of the current applied to the load circuit by the current sources at a target level by, in response to the voltage at the positive input pin exceeding a threshold, increasing current to the low-side current source to set the differential voltage across the load circuit, and
    the low-side clamping circuit is configured to control the high-side current source to maintain the sum of the current applied to the load circuit by the current sources at a target level by, in response to the voltage at the negative input pin exceeding a threshold, increasing current to the high-side current source to set the differential voltage across the load circuit.

14. The circuit of claim 10, wherein the high-side and low-side clamping circuits are respectively configured to maintain the sum of the current applied to the load circuit by the current sources at a target current level to control the amplitude of the voltage on the load in an operational voltage range that varies less than at least one of 0.5V and 0.1V.

15. The circuit of claim 10, wherein
    the load circuit includes two load circuits connected to one another via a common node between the load circuits, the positive and negative input pins being connected via the load circuits and common node, the common node being connected to a common voltage supply operated at a voltage level VCOMMON,
    the high-side current source is connected to a voltage supply operated at a voltage level VCC,
    the low-side current source is connected to ground, the high-side and low-side current sources are configured to operate in response to VCOMMON being at a level between VCC and ground, the high-side clamping circuit being configured to couple current to the low-side current source in response to VCOMMON exceeding VCC, and the low-side clamping circuit being configured to couple current to the high-side current source in response to VCOMMON dropping below ground.

16. A method for mitigating interference effects in a communications circuit having a load, a high-side current source coupled to a high-side input pin of a load and configured to operate the load at a high level, and a low-side current source coupled to a low-side input pin of the load and configured to operate the load at a low level, the method comprising:

in response to interference conditions that alter the current supplied by at least one of the current sources on one of the input pins, maintaining the sum of the current applied to the load by the current sources at a target current level.

17. The method of claim 16, wherein maintaining the sum of the current applied to the load by the current sources at a target current level includes using a clamping circuit to apply an offsetting current to one of the current sources, in response to a change in current in the other one of the current sources, to mitigate fluctuations in voltage amplitude on the load.

18. The method of claim 16, wherein maintaining the sum of the current applied to the load by the current sources at a target current level includes, in response to a voltage level at the high-side input pin exceeding a threshold by rising above a supply voltage level, applying an offsetting current to the low-side input pin, and in response to a voltage level at the low-side input pin exceeding a threshold by dropping below a ground level, applying an offsetting current to the high-side input pin.

19. The method of claim 16, wherein maintaining the sum of the current applied to the load by the current sources at a target current level in response to interference conditions that alter the current supplied by at least one of the current sources on one of the input pins includes, in a high-side clamp detection circuit, in response to detecting a voltage condition present at the high-side input pin that exceeds a supply voltage, coupling current to the low-side input pin to set the differential voltage across the load, and in a low-side clamp detection circuit, in response to detecting a voltage condition present at the low-side input pin that is below ground, coupling current to the high-side input pin to set the differential voltage across the load.

20. An interference-tolerant communications circuit comprising:

a high-side current source coupled to a high-side input pin of a load and configured to operate the load at a high level;

a low-side current source coupled to a low-side input pin of the load and configured to operate the load at a low level; and a control circuit configured to, in response to interference conditions that alter the current supplied by at least one of the current sources on one of the input pins, maintain the sum of the current applied to the load by the current sources at a target current level;

wherein the load includes two load circuits connected to one another via a common node between the load circuits, the high-side current source is connected to a first one of the load circuits at a node that is not between the two load circuits, the low-side current source is connected to a second one of the load circuits at a node that is not between the two load circuits, and a common voltage supply is connected to the common node between the load circuits.

21. The circuit of claim 20, wherein the control circuit includes, for each current source, a clamping circuit configured to apply an offsetting current to one of the current sources, in response to a change in current in the other one of the current sources, to mitigate fluctuations in voltage amplitude on the load.

22. The circuit of claim 20, wherein the load is a communications bus, and wherein the control circuit is configured to maintain the sum of the current applied to the load by the current sources at a target current level by, in response to one of the current sources going off, increasing the current in the other one of the current sources.

* * * * *